United States Patent [19]
Johnson et al.

[11] 3,908,572
[45] Sept. 30, 1975

[54] APPARATUS AND METHOD FOR ASSEMBLING ENDS TO CAN BODIES

[75] Inventors: Earl Willard Johnson; John Sherman Ringler; Bernard K. Hook, all of Hastings, Mich.

[73] Assignee: Gulf & Western Manufacturing Company, Southfield, Mich.

[22] Filed: July 22, 1974

[21] Appl. No.: 490,413

[52] U.S. Cl. ............... 113/1 E; 113/30; 93/39.2; 93/55.1 R
[51] Int. Cl.² .......................................... B21D 51/26
[58] Field of Search ......... 113/30, 7 R, 28, 29, 7 A, 113/12, 14 R, 14 A, 1 E, 114 BE, 80 R; 93/39.1 R, 55.1 M, 36.5 R, 39.2, 55.1 R

[56] References Cited
UNITED STATES PATENTS

| | | | |
|---|---|---|---|
| 858,785 | 7/1907 | Black | 113/1 E UX |
| 2,604,826 | 7/1952 | Palmer | 93/39.2 |
| 2,673,018 | 3/1954 | Trotter | 113/30 X |
| 3,416,412 | 12/1968 | Wilcox | 93/55.1 R |
| 3,835,619 | 9/1974 | Reisman | 93/55.1 R |

*Primary Examiner*—Milton S. Mehr
*Attorney, Agent, or Firm*—Meyer, Tilberry & Body

[57] ABSTRACT

Can ends are transported step-by-step from a supply hopper to a plurality of stations by a reciprocating feed mechanism. When a can end is shifted to the first station, the feed mechanism retracts to receive another can end from the supply hopper. At one of the stations, a joining compound or cement is applied to each can end. The can end with joining compound thereon is transferred by the feed mechanism to an assembly apparatus. The assembly apparatus includes a star wheel having circumferentially spaced lugs for engaging and moving a can end into alignment with a pocket in the star wheel. A can body is then deposited in the pocket in the star wheel and drops down onto the underlying compound treated can end. The can end and body are axially pressed together and the can end is peripherally clamped to the bottom peripheral edge of the can body while the joining compound at least partially cures.

33 Claims, 13 Drawing Figures

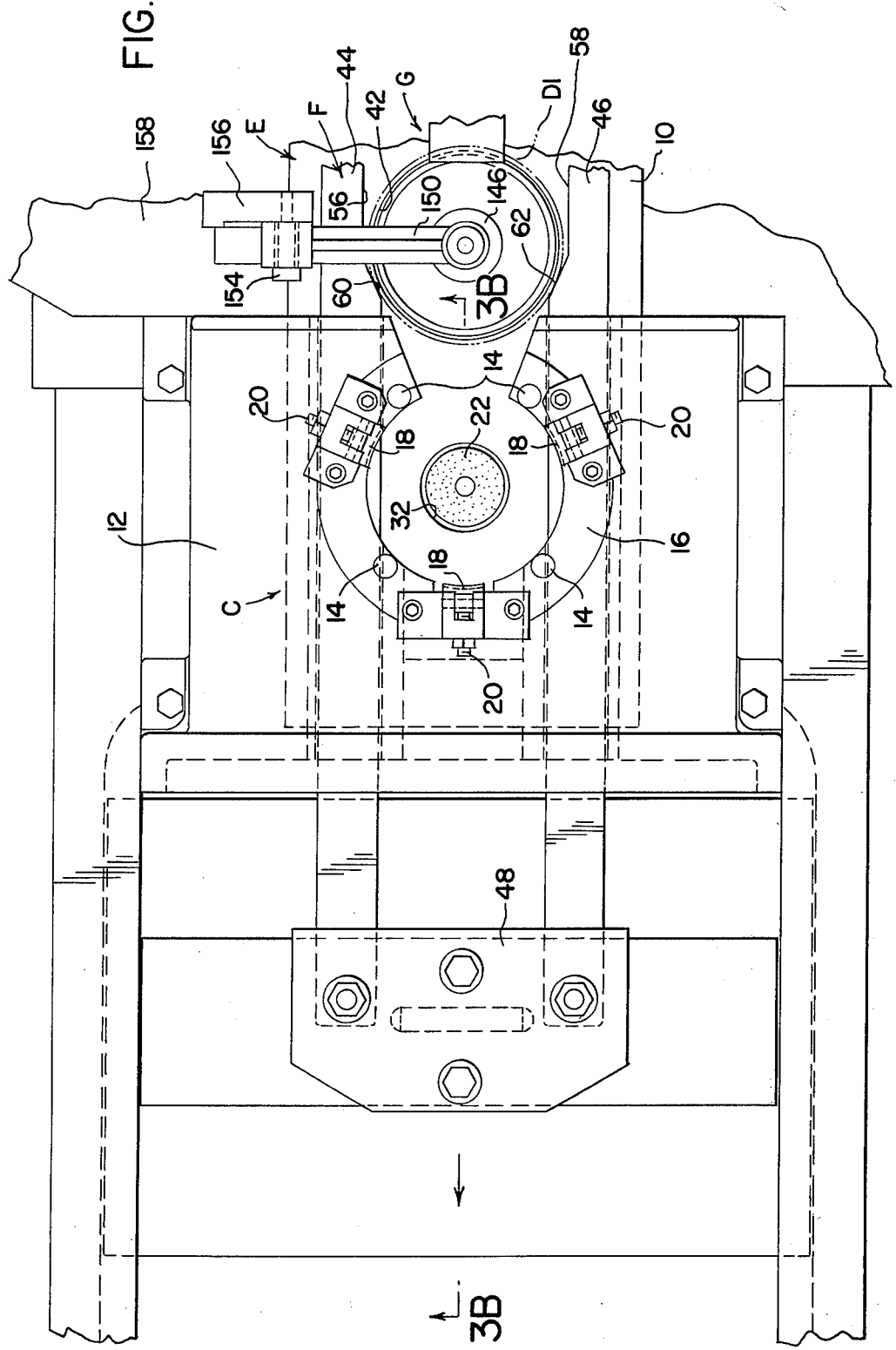

APPARATUS AND METHOD FOR ASSEMBLING ENDS TO CAN BODIES

BACKGROUND OF THE INVENTION

This application pertains to the art of can manufacture, and more particularly to an apparatus and method for assembling can ends onto can bodies. The invention may be used with metal can bodies and can ends, or with can bodies and can ends formed from other materials, such as fiberboard or the like.

SUMMARY OF THE INVENTION

The apparatus and method of the type described include a reciprocating feed mechanism for sequentially feeding can ends to a plurality of stations. The can ends are lifted at one of the stations and joining compound is applied thereto. Lifting of the can ends at the one station allows the feed mechanism to retract therebeneath.

A can end having had a joining compound applied thereto is transferred to a preliminary assembly unit including an in-feed star wheel provided with a plurality of circumferentially spaced can body receiving pockets therein. A can end is positioned beneath a pocket of the star wheel and is transported therewith to a can body in-feed station where a cylindrical can body is fed into the pocket to drop down onto the can end. The cemented can body and end unit is then transferred to an assembly turret where the can body and end are axially pressed together and the can end is clamped to the peripheral end edge of the can body while the joining compound at least partially cures to provide a good seal and strong joint. The assembled can body and end is then transferred from the assembly turret by a discharge star wheel.

In a preferred arrangement, detecting means is provided at the joining compound application station for detecting the absence of a can end at the station, thus to render the joining compound applicating means inoperative. This advantageously avoids spillage of joining compound onto the apparatus. In accordance with another arrangement, detecting means is provided for detecting the absence of a can body at a can body in-feed chute for rendering the can end feed mechanism inoperative so that a can end will not appear in the preliminary assembly unit in the absence of a can body. The latter arrangement advantageously avoids wastage of joining compound and can ends.

It is a principal object of the present invention to provide an improved apparatus and method for joining can ends to can bodies.

It is a further object of the present invention to provide such an apparatus and method which is very efficient and capable of operating at very high speeds.

It is an additional object of the present invention to provide such an apparatus and method for continuously joining can ends to can bodies.

BRIEF DESCRIPTION OF THE DRAWING

The invention may take form in certain parts and arrangements of parts, a preferred embodiment of which will be described in detail in conjunction with the accompanying drawings in which:

FIG. 3A is an enlarged plan view of the can end hopper feed and a first portion of the can end feed mechanism;

DESCRIPTION OF A PREFERRED EMBODIMENT

Figure 1:
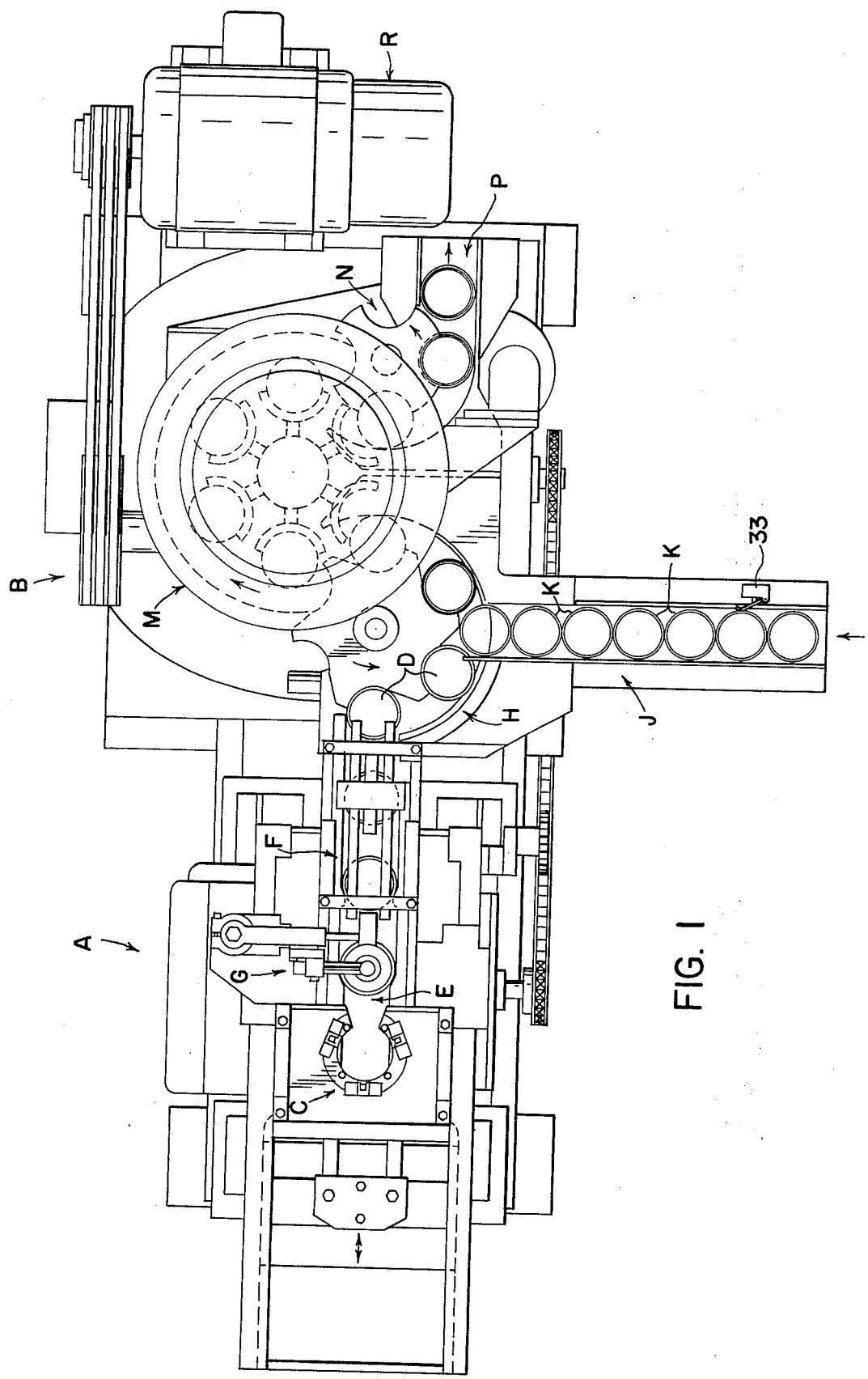
FIG. 1 is a top plan view of apparatus constructed in accordance with the present invention.
Figure 2:
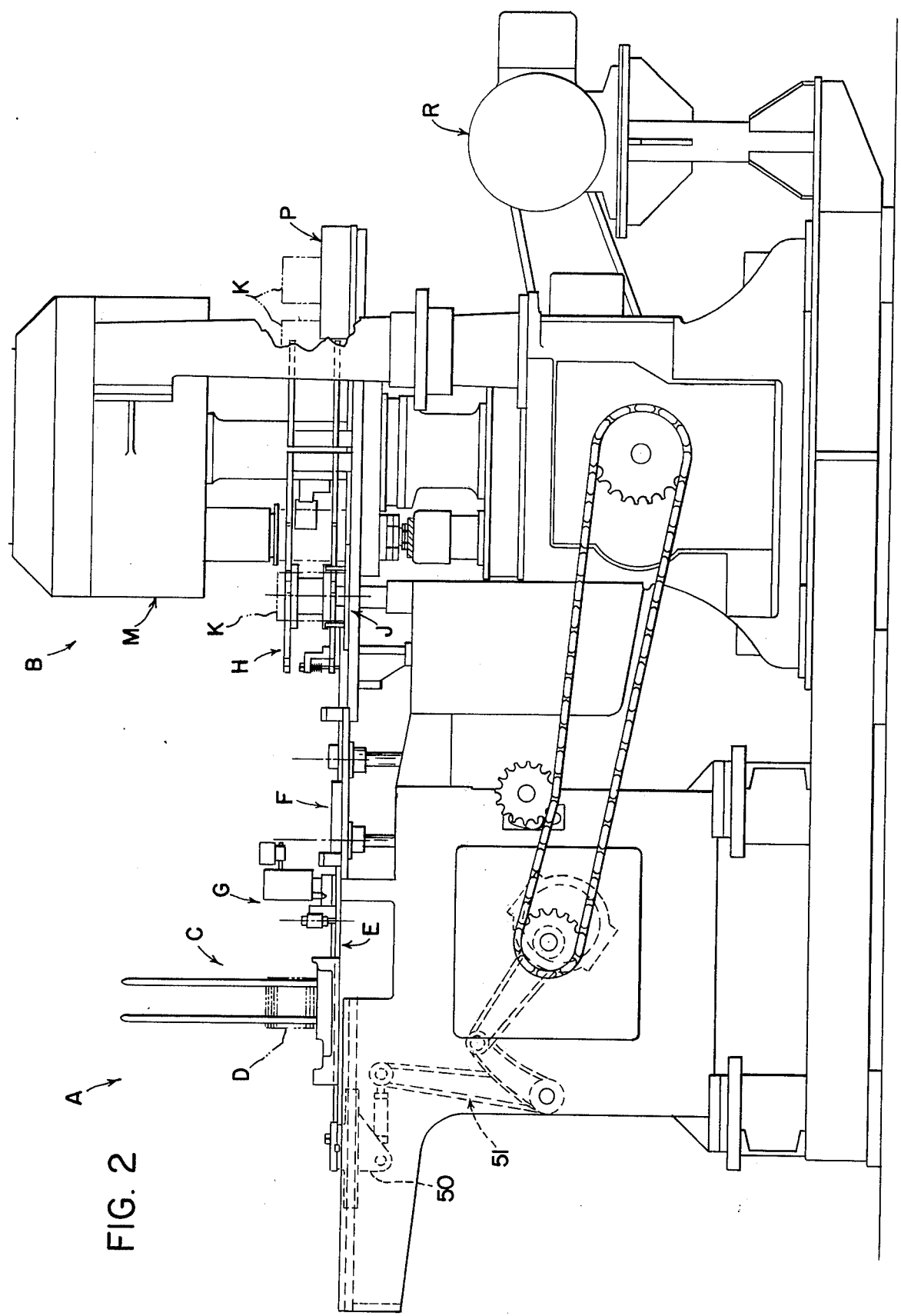
FIG. 2 is a side elevation view of the apparatus.

Referring now to the drawings, wherein the showings are for purposes of illustrating the preferred embodiment of the invention only and not for purposes of limiting same, FIGS. 1 and 2 show the general arrangement of apparatus constructed in accordance with the present invention. In this respect, the apparatus includes a can end supply and feed portion A and a can end and body assembly portion B. Supply and feed portion A includes a supply hopper C for supplying cylindrical can ends D one at a time onto a support surface E which extends beneath the hopper. A reciprocating feed mechanism F sequentially shifts can ends D from a location beneath the supply hopper along support surface E toward assembling portion B of the apparatus. A can end is displaced step-by-step along surface E, and the first step of movement positions the can end at an adhesive applying station where a holding and adhesive applying assembly G is operable to rotate the can end and apply adhesive to an upwardly open peripheral groove extending thereabout.

Following adhesive application, can end D is transferred by reciprocating feed mechanism F to can end and can body assemblying portion B. More particularly, the can end is first delivered to a preliminary assembly unit including an in-feed star wheel and guide assembly H. Assembly H is comprised of a star wheel and guide rail cooperable to transfer the can end along an arcuate path toward a can body in-feed mechanism J. In-feed mechanism J supplies an open-ended cylindrical can body K into coaxial overlying relationship with respect to a can end in a star wheel pocket therebeneath. When so aligned, the can body is dropped down so that the bottom peripheral edge thereof enters the peripheral groove in the can end and contacts the adhesive therein.

The initially assembled can body and end is then transported as a unit by in-feed star wheel and guide assembly H to a clamping turret assembly M. Turret assembly M includes upper and lower clamping devices which are initially spaced apart to receive the can body and end unit therebetween. As the turret assembly rotates subsequent to receiving the can body and end unit, the clamping devices are actuated to axially press the can end and body together, and the peripheral edge of the can end is radially clamped relative to the peripheral edge of the can body while the joining compound cures. Turret assembly M holds the clamped can body and can end while indexing over an arcuate path toward a discharge star wheel and guide assembly N including a star wheel having circumferentially spaced pockets for receiving the finished can body and end units. The assembled can body and end unit is transported by discharge assembly N along an arcuate path to a discharge chute P for removal from the apparatus.

A suitable drive motor R is provided and is connected through endless driven belts or the like with rotatable drive shafts in the apparatus frame to provide for reciprocating the feed mechanism for rotating the can end during adhesive application, and rotating the in-feed and discharge star wheels and the assembly turret. The reciprocating and rotating movements are synchronized to achieve the desired sequence of operation.

With regard now to the structure and operation of the components described in general above, supply hopper C and reciprocating feed mechanism F are shown in FIGS. 3A, 3B, 4A and 4B of the drawing. It will be understood that the right hand end of FIG. 3A mates with the left hand end of FIG. 4A, and that the right hand end of FIG. 3B mates with the left hand end of FIG. 4B. Support surface E along which can ends D are transported by feed mechanism F is comprised of an elongated plate 10 which is suitably supported by the apparatus frame. Can end supply hopper C is mounted on a base plate 12 which overlies plate 10 and is suitably interconnected with the apparatus frame. Hopper C includes a plurality of upstanding guide pins 14 mounted on an annular collar 16 for the radially inner edges of the rods to be tangent to the peripheral edges of can ends D disposed therebetween. A plurality of adjustable can end engaging stripper fingers 18 are mounted on collar 16 for engaging the lowermost can end in the hopper to support the can end against unintentional movement downwardly toward support surface E. Corresponding nut and bolt assemblies 20 provide for adjusting fingers 18 radially of collar 16.

The lowermost can end in the supply stack is adapted to be displaced therefrom and onto support surface E by means of a reciprocating suction cup member 22 having its lower end connected to a suitable vacuum source, not illustrated, through a control valve 23. Suction cup member 22 is adapted, at the appropriate time, to be elevated to engage the lowermost container end and, upon retraction, to strip the container end from fingers 18 and lower the container end onto surface E. The specific manner and mechanism by which such reciprocation is achieved does not form a part of the present invention and any suitable mechanism, such as a cam arrangement, can be employed for the intended purpose. Preferably, vacuum is drawn on vacuum cup 22 only when the cup is elevated to engage a can end and during movement of the can end thereby onto surface E. Control of the vacuum can be achieved in any desired manner. For example, vacuum cup 22 can be provided with a cam 25 movable therewith and operable during upward movement to engage roller 27 on a microswitch 29 operable through a normally closed switch 31 to actuate valve 23 which may be solenoid controlled. When roller 27 engages cam 25, switch 29 operates to actuate valve 23 to open the vacuum line. Similarly, when the suction cup descends, roller 27 leaves cam 25 and the withdrawn can end engages surface E, thus to close the vacuum line.

In the embodiment illustrated, can ends D are produced from paperboard and include an annular body portion 24 bounded by an upwardly open U-shaped peripheral groove 26 defined by radially spaced inner and outer walls 28 and 30, respectively. The can ends are adapted to be stacked in hopper C with peripheral grooves 26 opening upwardly and nested within one another, whereby outer groove defining wall 30 engages stripper fingers 18 when the can ends reach the level of the stripper fingers. Plate 10 is provided with an opening 32 therethrough to facilitate the reciprocating movement of suction cup 22.

Preferably, upper and lower limit switches 34 and 36, respectively, are provided to sense the level of can ends in the hopper and to maintain a desired level of can ends therein. Any suitable limit switch device, or other sensing means, can be employed for this purpose. In the embodiment illustrated, upper limit switch 34 includes a roller or the like 38 mounted on the switch arm and positioned to engage outer wall 30 of a can end at a desired high point with respect to hopper rods 14. Similarly, lower switch 36 includes a roller or the like 40 mounted on the switch arm and positioned to engage outer wall 30 of a can end at a desired low level with respect to hopper rods 14. When rollers 38 and 40 are engaged by a can end, the corresponding switch arm is displaced to open an electrical circuit through the corresponding switch. When the level of can ends falls beneath lower switch 36, roller 40 does not engage a can end and the switch is actuated to provide a signal representative of the low level condition. The signal can be a visual or audible signal or, alternatively, can operate to control supply means for automatically feeding can ends into the hopper. When the hopper level reaches upper switch 34, roller 38 is engaged to actuate the switch to produce a signal indicative of a filled hopper condition. The latter signal too can be an audible or visual signal, or, alternatively, can operate to discontinue the automatic feed of can ends to the hopper. Many suitable arrangements and detecting mechanisms can, of course, be employed to achieve the high level-low level functions.

A can end withdrawn from hopper C and positioned on support surface E by suction cup 22 is transported step-by-step by feed mechanism F from the hopper to in-feed star wheel and guide assembly H. In the embodiment illustrated, four steps of movement are employed to transfer a can end from the hopper position into a pocket of star wheel and guide assembly H. The first step of movement displaces the can end from beneath the hopper to a position overlying an opening 42 through plate 10 at the adhesive applying station where holding and adhesive applying assembly G described hereinabove is located. The position of a container end at the adhesive applying station is designated D1 in FIGS. 3A, 3B, 4A and 4B of the drawing. The second and third steps of movement position the can end in succeeding idle positions along support surface E, designated D2 and D3 in FIGS. 4A and 4B of the drawing. The fourth step of movement displaces the can end into star wheel and guide assembly H, and the position of the can end at this time is designated D4 in FIGS. 4A and 4B.

The structure of feed mechanism F by which the foregoing stepped displacement is achieved is as follows. Plate 10 defining support surface E supports a pair of laterally spaced apart feed bars 44 and 46 for reciprocating movement longitudinally of the feed mechanism. The ends of bars 44 and 46 at the hopper end are laterally spaced apart and interconnected by a cross plate and drive connection assembly 48 having a driven component 50 depending therefrom and interconnected with a drive linkage and crank mechanism 51 which is operable through motor R to impart reciprocating movement to the slide bars. The opposite ends of slide bars 44 and 46 are laterally spaced apart and interconnected by a cross member or plate 52 which is reciprocable with the slide bars. Longitudinal guide members 54 are mounted on opposite sides of plate 10 to guide the slide bars, and suitable guide forming recesses are also provided beneath hopper base plate 12 to guide longitudinal reciprocation of the slide bars.

Slide bars 44 and 46 are provided with opposed recesses 56 and 58, respectively, at first locations therealong, which recesses provide for a can end D to be received between the slide bars. Recesses 56 and 58 include laterally opposed inclined edges 60 and 62, respectively. Edges 60 and 62 are adapted to engage can end D to displace the can end from beneath the hopper to position D1 in response to reciprocating movement of the slide bars. Slide bars 44 and 46 are further provided with second recesses 64 and 66, respectively, which are longitudinally spaced from recesses 56 and 58. Recess 64 includes an inclined edge 68 and recess 66 includes a similar laterally opposed inclined edge 70, which edges engage a can end D to displace the can from position D1 to position D2 in response to reciprocating movement of the slide bars. Recesses 64 and 66 extend from the corresponding walls 68 and 70 to the ends of the slide bars adjacent star wheel and guide assembly H, whereby container ends D are adapted to be laterally received between the slide bars along the entire length of recesses 64 and 66.

In the positions of the components illustrated in FIGS. 3A, 3B, 4A and 4B the slide bars are fully displaced to the right hand position of the stroke thereof. Accordingly, a can end has been transported to position D1 by edges 60 and 62, and a can end has been displaced from position D1 to position D2 by recess edges 68 and 70. As explained hereinafter, can ends have also been displaced to positions D3 and D4 in response to movement of the slide bars to the right. Further, in a manner described more fully hereinafter, the can end in position D1 is elevated to a position above slide bars 44 and 46 during the adhesive application operation, and such elevation permits reciprocating movement of the slide bars to the left in the FIGURES, whereby recess edges 60 and 62 are positioned to engage a can end deposited on support surface E beneath hopper C and recess edges 68 and 70 are positioned to engage the can end at position D1 when the latter is lowered following the adhesive applying operation. It will be appreciated therefore that when the slide bars are in the left hand positions thereof suction cup 22 is elevated to strip a can end from the hopper stack and lower the end onto support surface E, and the can end at position D1 is lowered onto support surface E. Thereafter, the feed bars are moved to the right to displace the can end at the hopper station to position D1 and, simultaneously, to transport the can end with adhesive applied thereto from position D1 to position D2.

The can ends in positions D2 and D3 must be displaced to the corresponding succeeding positions thereof in response to movement of the slide bars to the right, and at the same time the can ends moved into positions D2 and D3 must be restrained from movement to the left in the FIGURES in response to the return movement of the slide bars to the left hand position thereof. The manner in which forward displacement and restraint against rearward displacement of the can ends is achieved is as follows. Can end holding vacuum cup assemblies 72 and 74 are provided beneath plate 10 in alignment with can end positions D2 and D3, respectively, and can end advancing assemblies 76 and 78 are mounted on cross plate 52 by means of a mounting block 77. Thus, the positions of assemblies 72 and 74 are fixed with respect to slide bars 44 and 46, and can end advancing assemblies 76 and 78 are reciprocable with the slide bars.

Figure 4A:
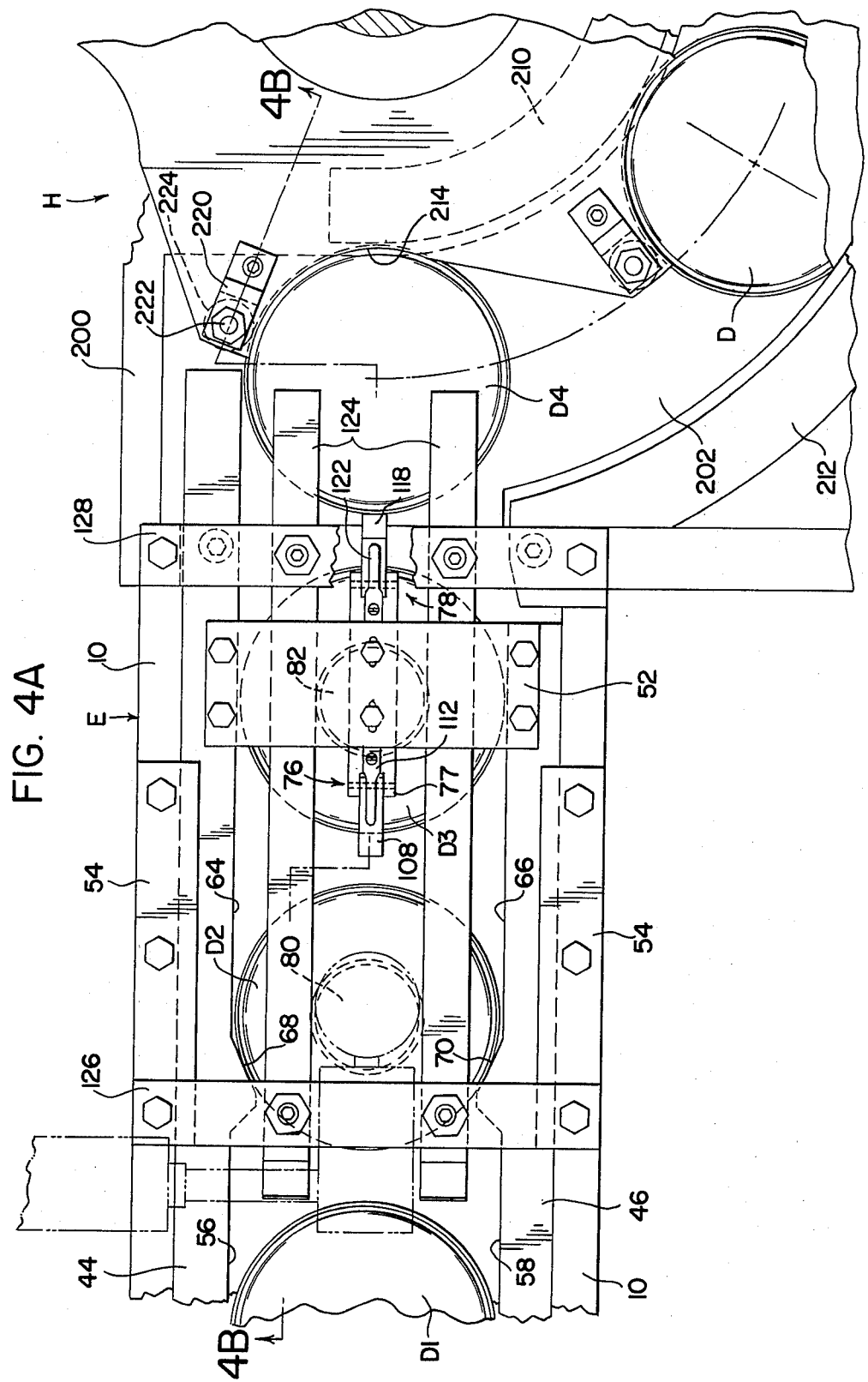
FIG. 4A is an enlarged plan view of a second portion of the can end feed mechanism.
Figure 4B:
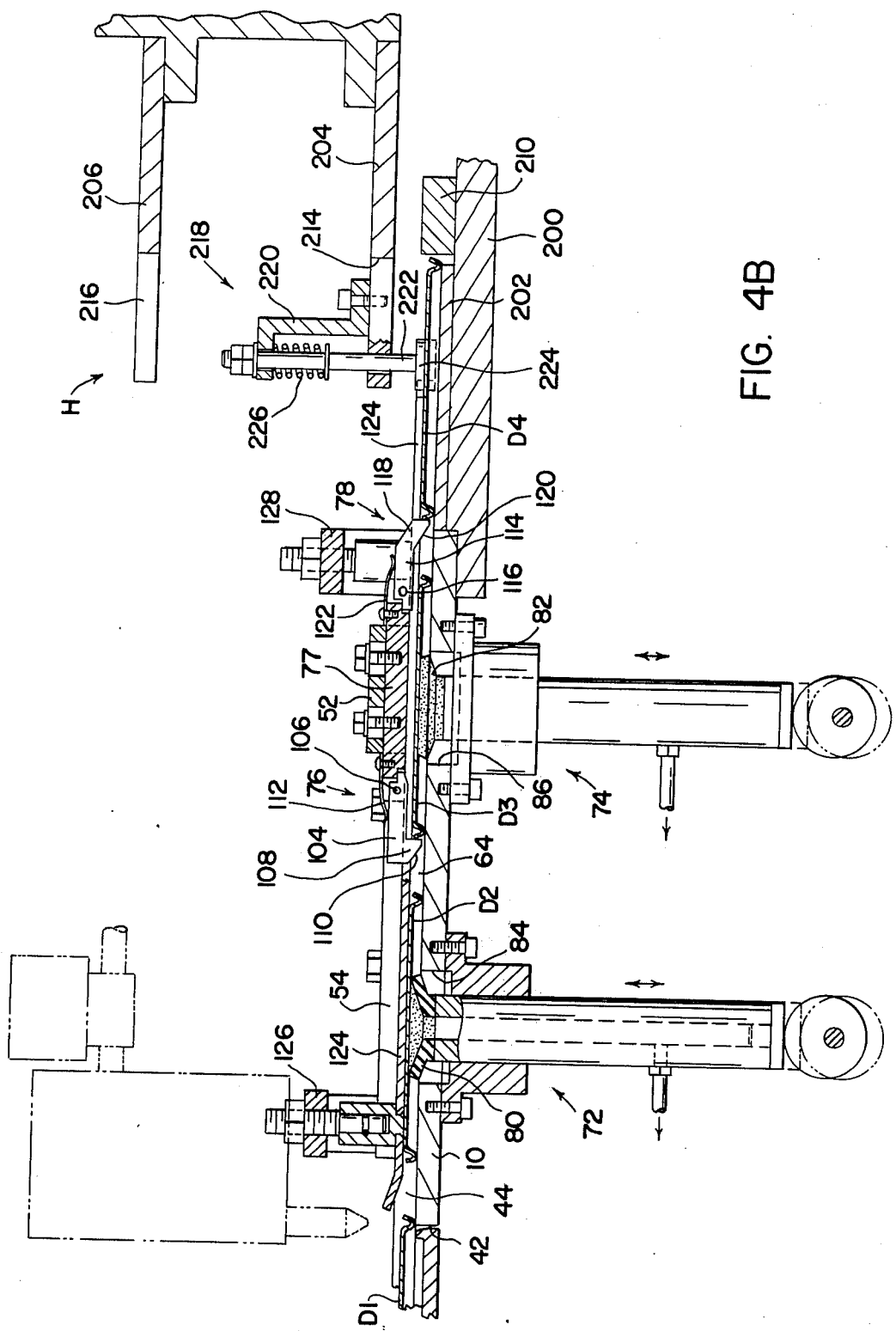
FIG. 4B is a sectional elevation along line 4B—4B of FIG. 4A.

Holding arrangements 72 and 74 include reciprocable vacuum cup members 80 and 82, respectively, suitably supported beneath plate 10 for reciprocating movement from positions beneath plate 10 to the positions illustrated in FIG. 4B in which each cup engages a can end located in the corresponding one of the positions D2 and D3. Each suction cup is connected to a vacuum source, not illustrated, which may be common to both cup members. Reciprocation of members 80 and 82 can be achieved in any desired manner, such as by a suitable cam mechanism, and it will be appreciated that the members are moved to the positions illustrated in FIG. 4B when can ends are positioned and are to be held at positions D2 and D3 during return movement of the slide bars to the left. Suction is applied to members 80 and 82 to hold can ends in the respective positions during return movement of the slide bars. The vacuum is then relieved and members 80 and 82 move downwardly through corresponding openings 84 and 86 in plate 10 to permit the next advance movement of the slide bars to the right hand positions thereof. Such application and removal can be achieved by cam and switch means similar to that described above with regard to vacuum cup member 22.

Can end advancing assembly 76 includes a finger 104 supported for pivotal movement clockwise as viewed in FIG. 4B by a pivot pin 106. Finger 104 includes a nose portion 108 projecting downwardly into the path of movement of can ends on support surface E and having a cam surface 110 which is adapted to be engaged by a can end to pivot finger 104 in the clockwise direction. A spring 112 biases finger 104 against clockwise pivotal movement. Similarly, can end advancing arrangement 78 includes a finger 114 supported for pivotal movement counterclockwise as viewed in FIG. 4B by a pivot pin 116. Finger 114 includes a nose portion 118 having a cam surface 120 adapted to be engaged by a can end to pivot the finger in a counterclockwise direction. A spring 122 biases finger 114 against counterclockwise pivotal movement.

Holding mechanisms 72 and 74 and can end advancing mechanisms 76 and 78 are positioned laterally centrally of the feed mechanism and operate in cooperation with a pair of laterally spaced apart longitudinally extending hold-down rails 124 to achieve the can end holding and advancing functions. Rails 124 are supported at their opposite ends by cross bars 126 and 128 which are spaced above slide bars 44 and 46 and are suitably interconnected with plate 10. Hold-down rails 124 are spaced above support surface E of plate 10 a distance corresponding substantially to the height of can ends D, whereby the can ends are slidable therebeneath but are restrained against displacement upwardly from the support surface.

The operation of holding arrangements 72 and 74 and can end advancement arrangements 76 and 78 is as follows. When recess edges 68 and 70 engage a can end in position D1 and move the can end to position D2, the can end passes beneath hold-down bars 124 to prevent its upward displacement from support surface E. At the same time, as described hereinafter, nose 108 of finger 104 pulls a can end from position D2 to position D3, and nose 118 of finger 114 pushes a can end from position D3 to position D4. Holding arrangements 72 and 74 are then actuated for the suction cup members to engage and hold the can ends in positions D2 and D3.

Return movement of slide bars 44 and 46 to the left from the positions illustrated in FIGS. 3A, 3B, 4A and 4B causes can end advancing mechanisms 76 and 78 to move across the can ends held in positions D2 and D3, respectively. In this respect, cam surface 110 of finger 104 engages the leading end of the can end in position D2, whereby finger 104 is biased clockwise for the finger to ride across the top of the can end in position D2. When nose portion 108 of finger 104 passes the trailing end of the can end spring 112 biases finger 104 counterclockwise for nose 108 to engage behind the can end. Movement of slide bars 44 and 46 to the left in the foregoing manner simultaneously provides for finger 114 to be pivoted counterclockwise by engagement with the can end in position D3 for the finger to ride across the top thereof. When the finger passes the trailing end of the can end spring 122 biases the finger clockwise to position the finger behind the can end. The subsequent movement of the slide bars to the right, following vacuum release and downward displacement of members 80 and 82, displaces advancing arrangements 76 and 78 to the right. Accordingly, nose 108 of finger 104 pulls the can end in position D2 to position D3 and nose 118 of finger 114 pushes the can end in the position D3 to position D4 for pickup by the star wheel and guide assembly H.

Figure 5:
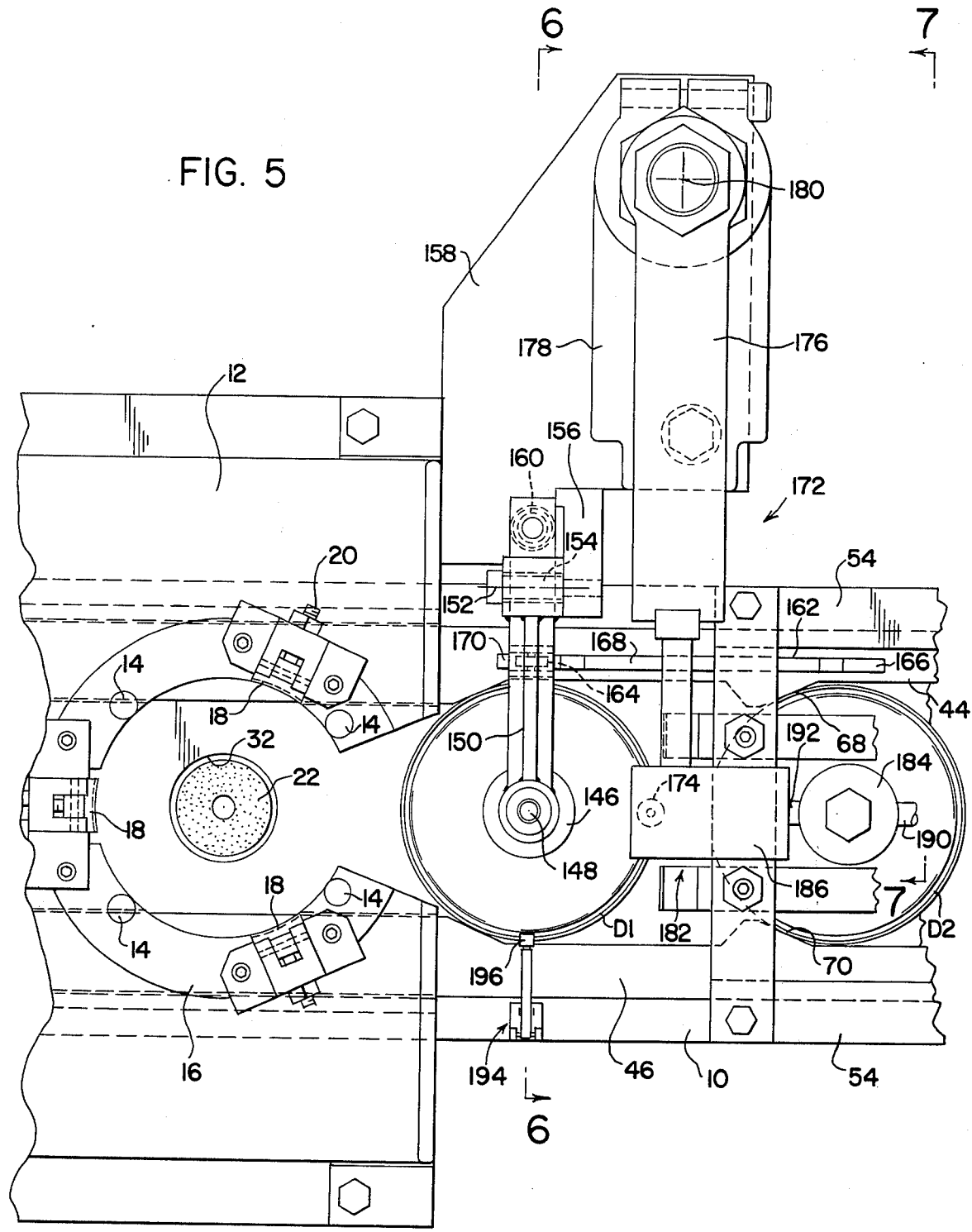
FIG. 5 is an enlarged plan view of the can end holding and adhesive applying assembly of the apparatus.
Figure 6:
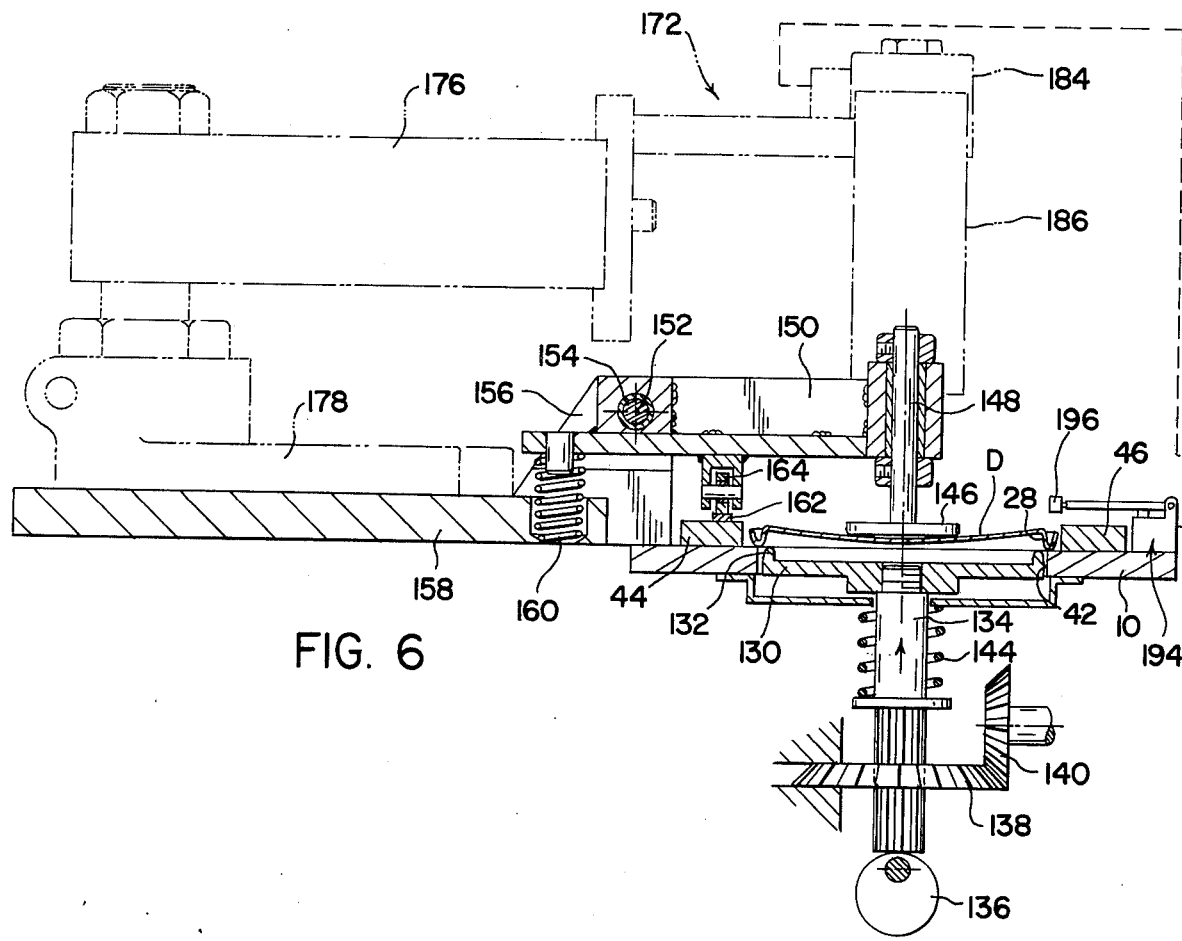
FIG. 6 is a sectional elevation view of the can end holding arrangement taken along line 6—6 of FIG. 5.
Figure 7:
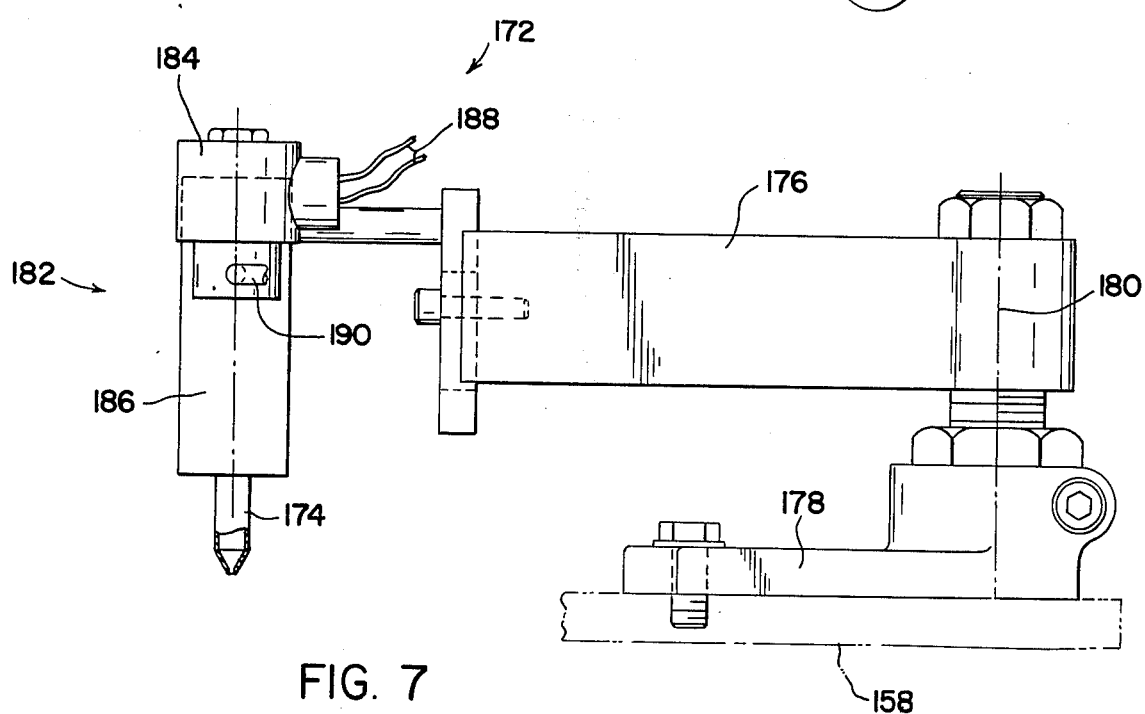
FIG. 7 is a sectional elevation view of the adhesive applying arrangement taken along line 7—7 of FIG. 5.

As mentioned hereinabove, a can end is first transferred from a position beneath hopper C to a holding and adhesive applying station. At the latter station the can end is elevated to permit retraction of the feed mechanism, and adhesive is applied to the can end while it is in the elevated position. The can end holding and adhesive applying assembly G by which these operations are achieved is illustrated in FIGS. 5, 6 and 7 of the drawings. The can holding mechanism includes a lift chuck 130 positioned in opening 42 in plate 10. Lift chuck 130 includes an upper peripheral surface portion 132 contoured to be received radially within inner groove defining wall 28 of a can end D positioned thereover. Lift chuck 130 is suitably mounted on a shaft 134 which is supported for vertical reciprocating movement relative to plate 10 in response to rotation of a cam 136 engaging the lower end of shaft 134. Lift chuck 130 is further suitably supported for rotation relative to plate 10 about a vertical axis. Rotation can be imparted to lift chuck 130 in any suitable manner. In the embodiment illustrated, a bevel gear 138 is interconnected with the lift chuck and has teeth in meshing engagement with a drive gear 140 which is adapted to be driven by motor R of the apparatus. A biasing spring 144 operates to bias the lift chuck downwardly relative to plate 10.

The can end holding mechanism further includes a hold-down plate 146 having a shaft 148 supported for rotation relative to a holding arm 150 positioned above plate 10. Holding arm 150 is supported for pivotal movement toward and away from plate 10 about an axis 152 extending longitudinally of the can end feed path and defined by a pivot pin 154 interconnecting arm 150 and a support bracket 156. Support bracket 156 is part of a support plate structure 158 suitably attached to the apparatus and extending laterally from plate 10. A spring 160 biases holding arm 150 to pivot clockwise about axis 152 as viewed in FIG. 6 of the drawing to move holding plate 146 toward lift chuck 130.

During a can end transferring operation in which a can end is displaced from below the hopper to a position overlying lift chuck 130, holding arm 150 is displaced upwardly from the position illustrated in FIG. 6 to permit movement of the can end therebeneath. For this purpose, reciprocating feed bar 44 is provided with a cam strip 162 extending longitudinally of the feed line, and lift arm 150 is provided with a cam follower roller 164 adapted to engage and ride along the surface of cam strip 162. Cam strip 162 has a front cam surface 166, an intermediate cam surface 168, and a rear cam surface 170. Intermediate cam surface 168 is elevated above front and rear surfaces 170, whereby holding arm 150 is elevated relative to lift chuck 130 when follower roller 164 engages intermediate surface 168. Thus, presuming feed bars 44 and 46 to be in the left hand position thereof from the position illustrated in FIG. 5, follower roller 164 engages front cam surface 166. When the feed bars move to the right follower roller 164 rides onto intermediate cam surface 168, whereby lift arm 150 is pivoted counterclockwise to elevate holding plate 146 relative to lift chuck 130. When the can end displaced from the hopper by recess edges 60 and 62 of the feed bars reaches a position beneath lift arm 150 follower roller 164 descends onto rear surface 170, whereby holding plate 146 is lowered to engage the can end therebeneath.

Reciprocation of lift chuck 130 is coordinated with the reciprocating movement of feed bars 44 and 46 such that cam 136 operates to elevate lift chuck 130 when the feed bars reach the positions illustrated in FIG. 5 of the drawing. Elevation of the lift chuck is sufficient to provide for the feed bars to pass therebeneath in movement thereof to the left in FIG. 5. Such elevation is necessary, of course, because of the inwardly projecting feed bar surfaces 68 and 70 which must be positioned behind the can end at the adhesive applying station to achieve advancement of the can end along the apparatus following the adhesive applying operation. When cam 136 operates to elevate lift chuck 130, holding plate 146 cooperates with the lift chuck to clamp the can end therebetween. In this respect, upward displacement of lift chuck 130 pivots lift arm 150 counterclockwise against the bias of spring 160 which accordingly applies clamping pressure on the can end. Can end D, of course, rotates with the lift chuck, and upon engagement of the can end with holding plate 146 the latter rotates with the can end and chuck.

Upon elevation of the rotating can end by chuck 130, adhesive applying mechanism 172 is actuated for a suitable adhesive to be discharged into the upwardly open peripheral groove 26 of the can end. As set forth more fully hereinafter, the adhesive applying mechanism includes a discharge nozzle 174 positioned above the can end and in alignment with groove 26 so that a line of adhesive is deposited in the groove as the can end is rotated. Any suitable adhesive applying mechanism can be employed. In the embodiment illustrated, adhesive applying mechanism 172, as seen in FIGS. 5 and 7, includes a support arm 176 mounted on plate 158 by a support bracket 178 in a manner which provides for releasing the arm for pivotal movement of the arm about axis 180 and axial adjustment of the arm relative to axis 180. These adjustments, of course, enable proper positioning of nozzle 174 relative to groove 26 of a can end. A glue feed and nozzle assembly 182 is mounted on the end of arm 176 facing the feed line and includes a solenoid controlled valve 184, an adhesive reservoir housing 186 and discharge nozzle 174 communicating with reservoir 186. Solenoid valve 184 has suitable conductors 188 for controlling operation thereof and includes an adhesive inlet line 190 leading to a suitable source of supply of adhesive, not illustrated. A flow line 192 connects supply line 190 with reservoir housing 186 through valve 184, whereby opening of the solenoid valve provides for adhesive flow into housing 186 and corresponding quantity of adhesive flow through discharge nozzle 174. It will be appreciated that hot or cold adhesive can be employed and that heating means for reservoir 186 can be provided if a hot adhesive is used.

The discharge of adhesive into groove 26 of a container end is coordinated with the upward displacement of lift chuck 130. For this purpose, a sensing device such as microswitch 194, for example, is provided to detect the presence of a can end in the elevated position thereof so as to control actuation of the solenoid valve 184 to achieve adhesive discharge into recess 26. Any suitable microswitch or other detecting arrangement can be employed for this purpose and, as illustrated herein, the microswitch includes a roller 196 mounted on the switch arm and supported to engage the upper edge of outer groove defining wall 30 of the can end when the latter reaches the appropriate height to receive adhesive. Engagement of roller 196 with the can end actuates solenoid valve 184 to achieve adhesive discharge into recess 26. When lift chuck 130 descends, wall 30 of the can end moves out of engagement with roller 196 whereby the microswitch operates to de-energize the solenoid valve and stop adhesive delivery. The microswitch performs an additional important function. In this respect, should the feed mechanism for some reason fail to deliver a can end to the adhesive applying station, elevation of the lift chuck 130 will take place to permit retraction of the feed mechanism, but microswitch 194 will not be actuated. Accordingly, the undesirable spillage of adhesive onto the underlying mechanism is avoided.

As mentioned above, elevation of the lift chuck during the adhesive applying operation enables return movement of feed bars 44 and 46 to the left hand positions thereof. The latter movement positions cam strip 162 for front cam surface 166 to be disposed beneath follower roller 164, positions feed bar surfaces 60 and 62 to receive a can end stripped from hopper C, and positions feed bar surfaces 68 and 70 to receive the can end at the adhesive applying station upon return movement of lift chuck 130 to its lowermost position. With the feed bars so positioned, a can end is stripped from the hopper and the can end with glue applied thereto is returned to support surface E. Feed bars 44 and 46 then move to the right, whereby follower roller 164 rides upwardly onto intermediate cam surface 168 to elevate holding plate 146 sufficiently for the can end beneath the hopper to be delivered to the adhesive applying station. Simultaneous with such displacement, of course, the can end with adhesive applied thereto is transported from the adhesive applying station to the next position along the feed line.

Figure 8:
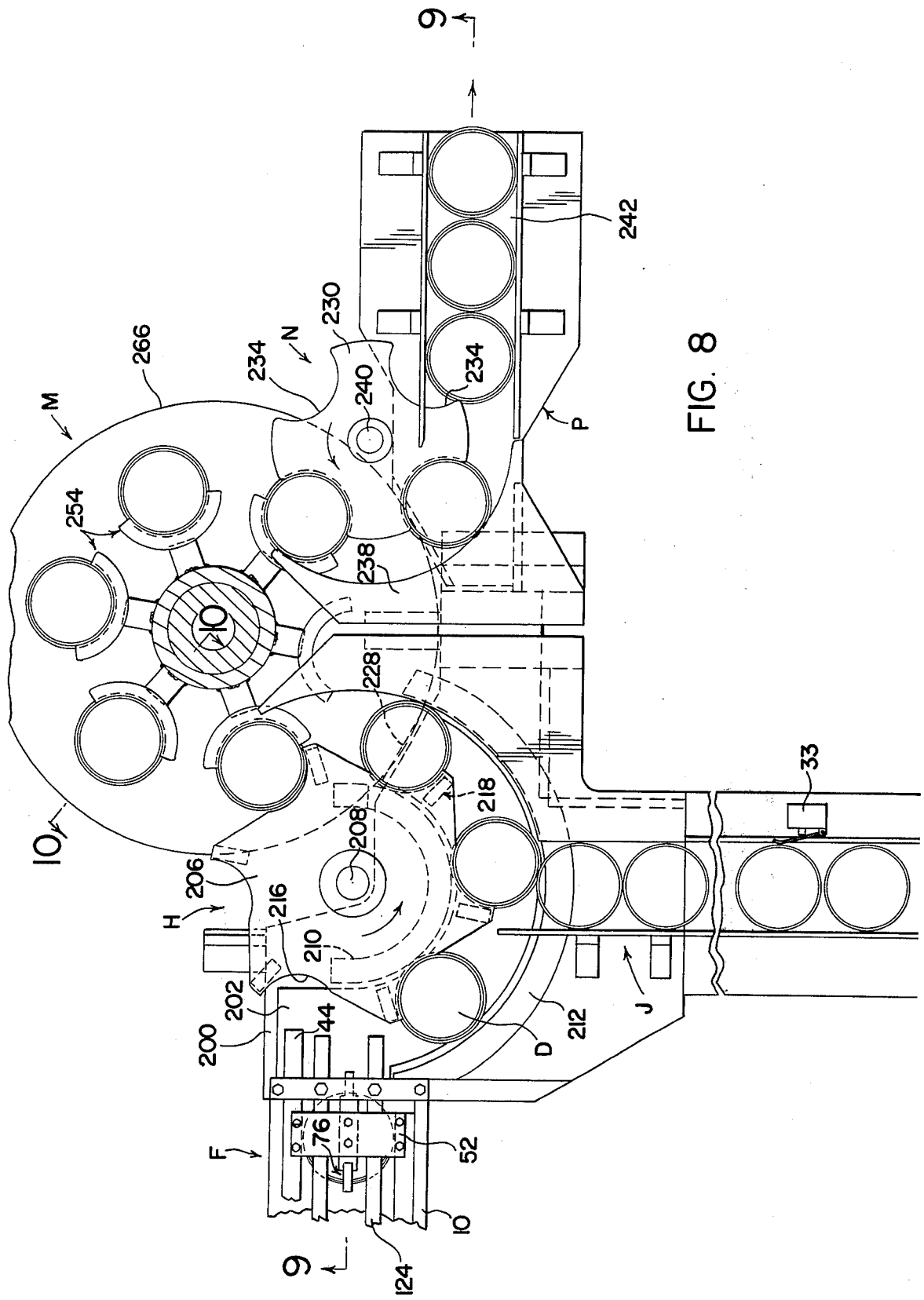
FIG. 8 is enlarged enlaarged plan view of the can end and can body assembling portion of the apparatus.
Figure 9:
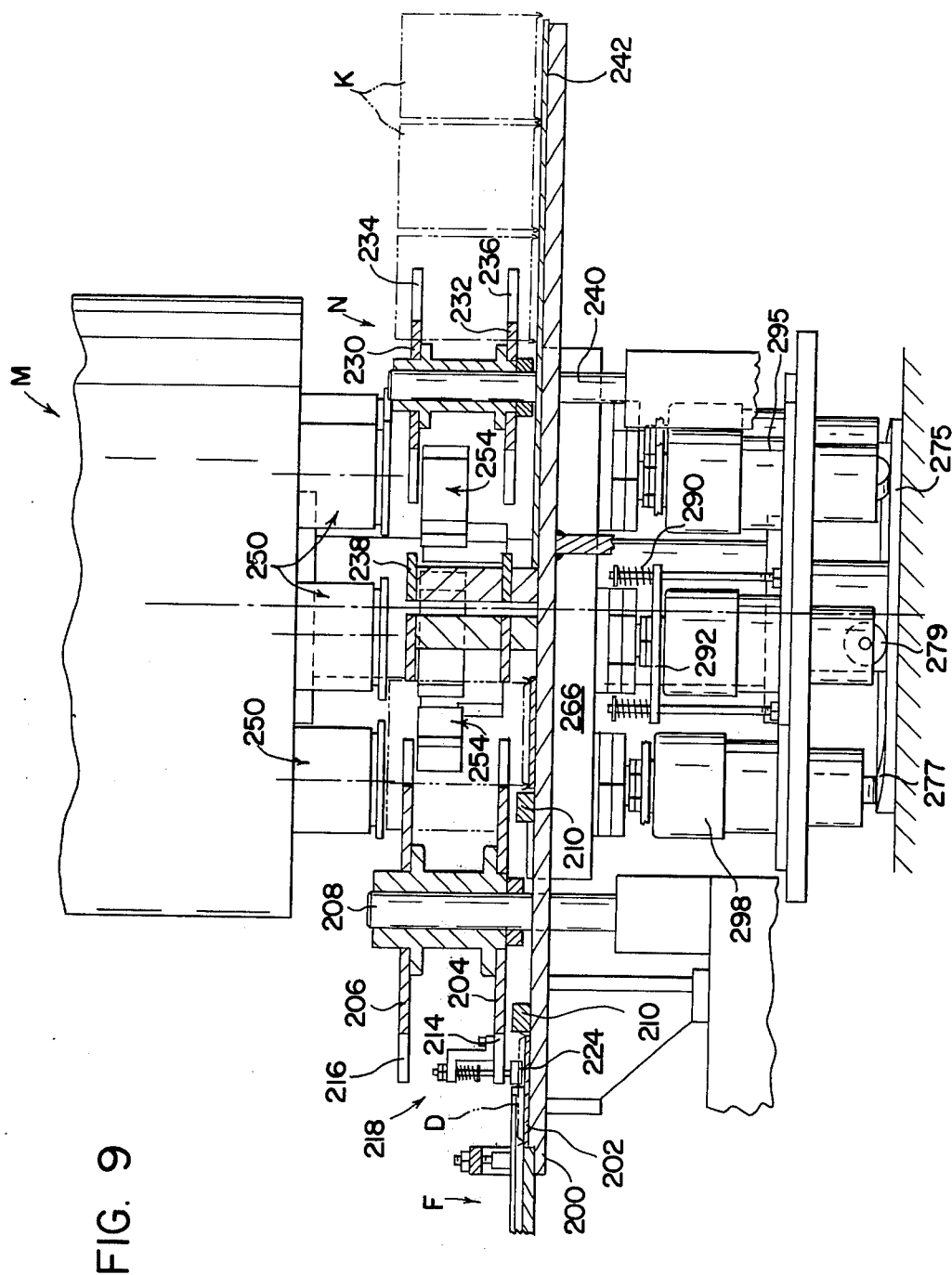
FIG. 9 is a sectional elevation view of the can end and can body assembling portion taken along line 9—9 in FIG. 8.

A can end with adhesive applied thereto in the foregoing manner is eventually transferred as described above to in-feed star wheel and guide mechanism H. The latter mechanism, as best illustrated in FIGS. 8 and 9 of the drawing, includes a base plate 200 adjacent the discharge end of feed mechanism F. Base plate 200 supports an arcuate plate 202 onto which a can end D is displaced by the feed mechanism. Mechanism H further includes a pair of vertically spaced star wheels 204 and 206 mounted on a shaft 208 for rotation together about a vertical axis. Base plate 200 further supports an inner arcuate guide rail 210 and an outer arcuate guide rail 212 positioned on radially opposite sides of arcuate support plate 202. Star wheels 204 and 206 are provided with vertically aligned pockets 214 and 216 for the purpose set forth hereinafter, and the trailing ends of pockets 214 in lower star wheel 204, in the direction of rotation of the star wheels, each carry a can end displacing pin assembly 218.

Each pin assembly 218 includes a support bracket 220 mounted on star wheel 204, and a vertical rod 222 which extends downwardly through a corresponding opening in star wheel 204. Rod 222 terminates in an enlarged head 224 disposed adjacent the upper surface of support plate 202. When a can end D is displaced onto support plate 202 from the feed mechanism, indicated by position D4 in FIG. 4A, head 224 engages the can end to move the latter along support plate 202 in vertical alignment with pockets 214 and 216 of the star wheels. A spring 226 surrounds pin 222 to bias the latter downwardly and to permit vertical reciprocation of the pin against the spring bias.

When a can end is discharged onto support plate 202, head 224 of the pin engages the can end and displaces the end in the counterclockwise direction as viewed in FIG. 8. Such displacement moves the can end along an arcuate path defined by inner and outer guide rails 210 and 212 and which path leads to can body input assembly J positioned 90° from the discharge end of the feed mechanism. Any suitable can body feed mechanism can be employed to achieve feeding of a can body into vertically aligned star wheel pockets 214 and 216 when such pockets are in alignment with the can body in-feed chute. For example, a helical screw mechanism, not illustrated, can be rotated in synchronism with the can end displacing and star wheel movement functions to displace a can body into a star wheel pocket at the proper time. As is well known, such a screw conveyor receives and moves the can bodies in properly spaced relationship toward the discharge end of the in-feed chute. The can bodies are transported along the can body in-feed chute at a level above a can end on support plate 202 and, when discharged from the in-feed chute, the can body drops downwardly for the lower peripheral edge thereof to enter upwardly open groove 26 of the can body. The can body has a vertical height such that the upper end thereof extends above upper star wheel 206, whereby pockets 214 and 216 together with the corresponding pin assembly 218 cooperate to guide movement of the container end and can body assembly from the can body in-feed station toward clamping turret assembly M.

Figure 3B:
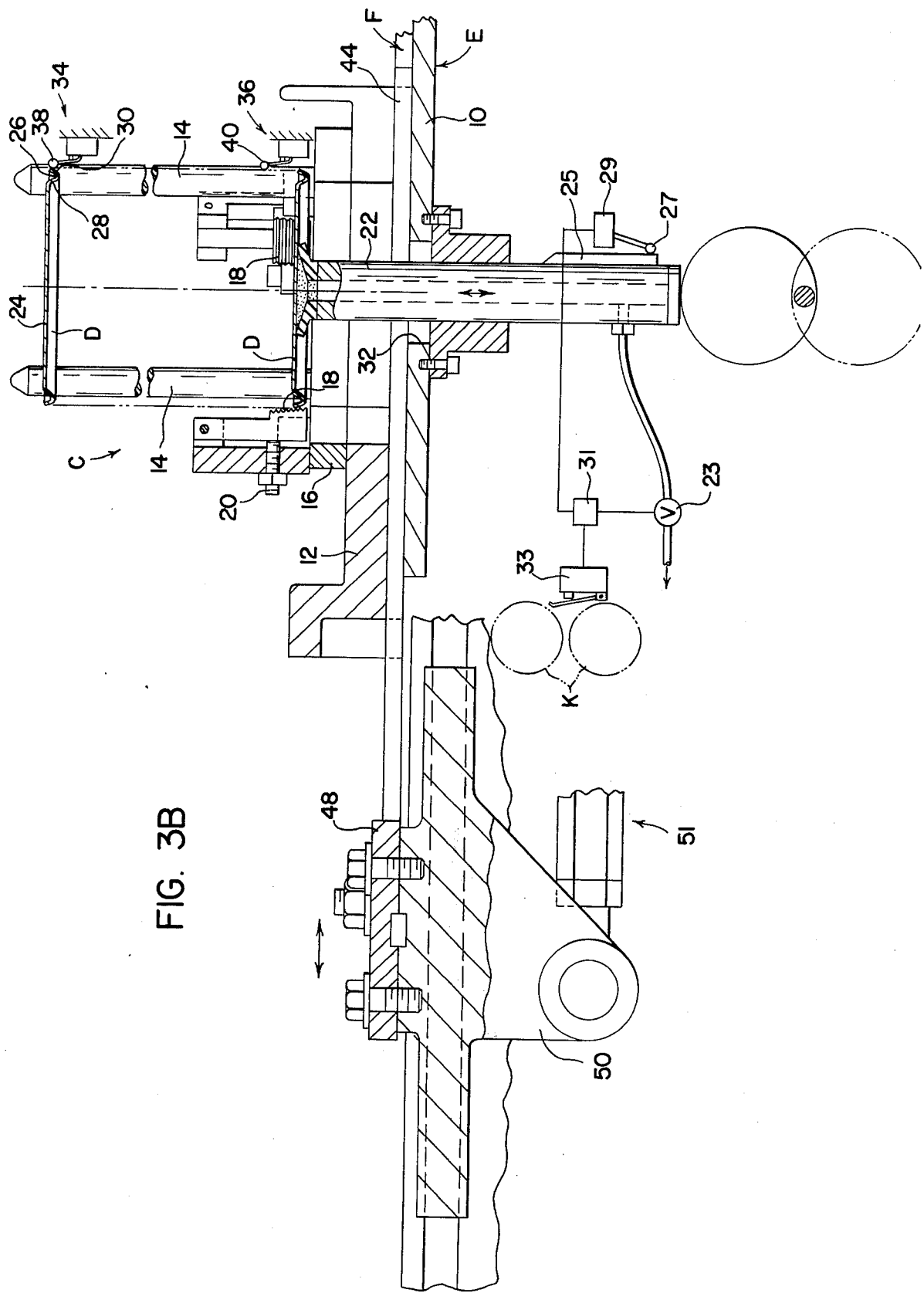
FIG. 3B is a sectional elevation along line 3B—3B in FIG. 3A.

Referring momentarily to FIGS. 1 and 3B of the drawing, it is preferred to coordinate the withdrawal of a can end from hopper C by suction cup 22 with the delivery of a corresponding can body K toward the in-feed star wheel. In this respect, in the absence of a can body at the appropriate location along the can body in-feed chute, it is desirable to prevent the withdrawal of the corresponding can end from chute C. Otherwise, a can end and the adhesive applied thereto are wasted in that there will be no can body for preliminary assembly therewith when the can end is transferred to a position beneath the discharge end of the can body in-feed chute.

Any suitable control arrangement can be provided for the foregoing purpose. For example, as shown in FIGS. 1 and 3B, a can body detector switch 33 is positioned at a predetermined location along the can body in-feed chute. The location of switch 33 is such that a can body at the location is spaced from the discharge end of the chute a feed distance which coordinates the assembly thereof with a given can end withdrawn from hopper C and delivered to a position beneath the discharge end of the can body in-feed chute. As schematically illustrated in FIG. 3B, detector switch 33 is electrically interconnected with normally closed switch 31 controlling valve 23 in the vacuum supply to vacuum cup member 22. In the event that a can body is missing from the feed chute at the location of detector switch 33, the latter operates to cause normally closed switch 31 to open. Accordingly, closure of microswitch 29 in response to upward movement of vacuum cup member 22 does not open valve 23, and the vacuum cup member rises and descends without withdrawing a can end from the bottom of the stack in hopper C. Normally closed switch 31 remains open until a can body K is again detected in the in-feed chute by detector switch 33 which then operates to cause closure of normally closed switch 31 for the next rising movement of vacuum cup member 22 to cause the application of vacuum through the member to achieve can end withdrawal. It will be appreciated, of course, that suitable electrical power supply lines and conductors, not illustrated, are provided to achieve the desired electrical interconnections and operations.

Referring again to FIGS. 8 and 9, clamping turret assembly M includes a plurality of positioning, clamping and crimping mechanisms which are described in greater detail hereinafter. The latter mechanisms rotate clockwise with the turret mechanism to receive a can body and can end assembly upon coordinated alignment thereof with movement of the star wheels 204 and 206. Such alignment occurs as the can body and can end assembly reaches end 228 of support plate 202. Turret mechanism M transfers the can body and can end assemblies to discharge star wheel and guide assembly N which includes upper and lower discharge star wheels 230 and 232, respectively, having corresponding and vertically aligned pockets 234 and 236. Discharge assembly N further includes an arcuate guide wall 238 leading to discharge chute P. Star wheels 230 and 232 are mounted on a rotatable shaft 240 for rotation together in a counterclockwise direction as viewed in FIG. 8. Accordingly, can body and can end assemblies delivered into vertically aligned pockets 234 and 236 are transported along an arcuate path toward discharge chute P leading away from the apparatus. During such movement, the can end of the assembly is supported by and slides along a support surface defined by a fixed plate 242 positioned beneath the star wheels.

During transporting of the can body and can end assemblies by turret mechamism M, the body and end are axially pressed together and the inner and outer walls defining the peripheral groove in the can end are radially crimped into tight engagement with the peripheral end portion of the container wall disposed therebetween. Moreover, the clamping and crimping pressure application is maintained for about 240° of rotation of the turret mechanism, thus to assure maximum curing time for the adhesive prior to release of the clamping and crimping pressures. The clamping and crimping mechanisms of turret assembly M by which the assembly is completed are each comprised of a pair of opposed components between which the can body and can end are disposed during movement toward discharge assembly N. The structure and operation of the positioning clamping and crimping assemblies will be best understood by referring to the illustration of one such assembly in FIGS. 10 and 11 of the drawing.

Figure 10:
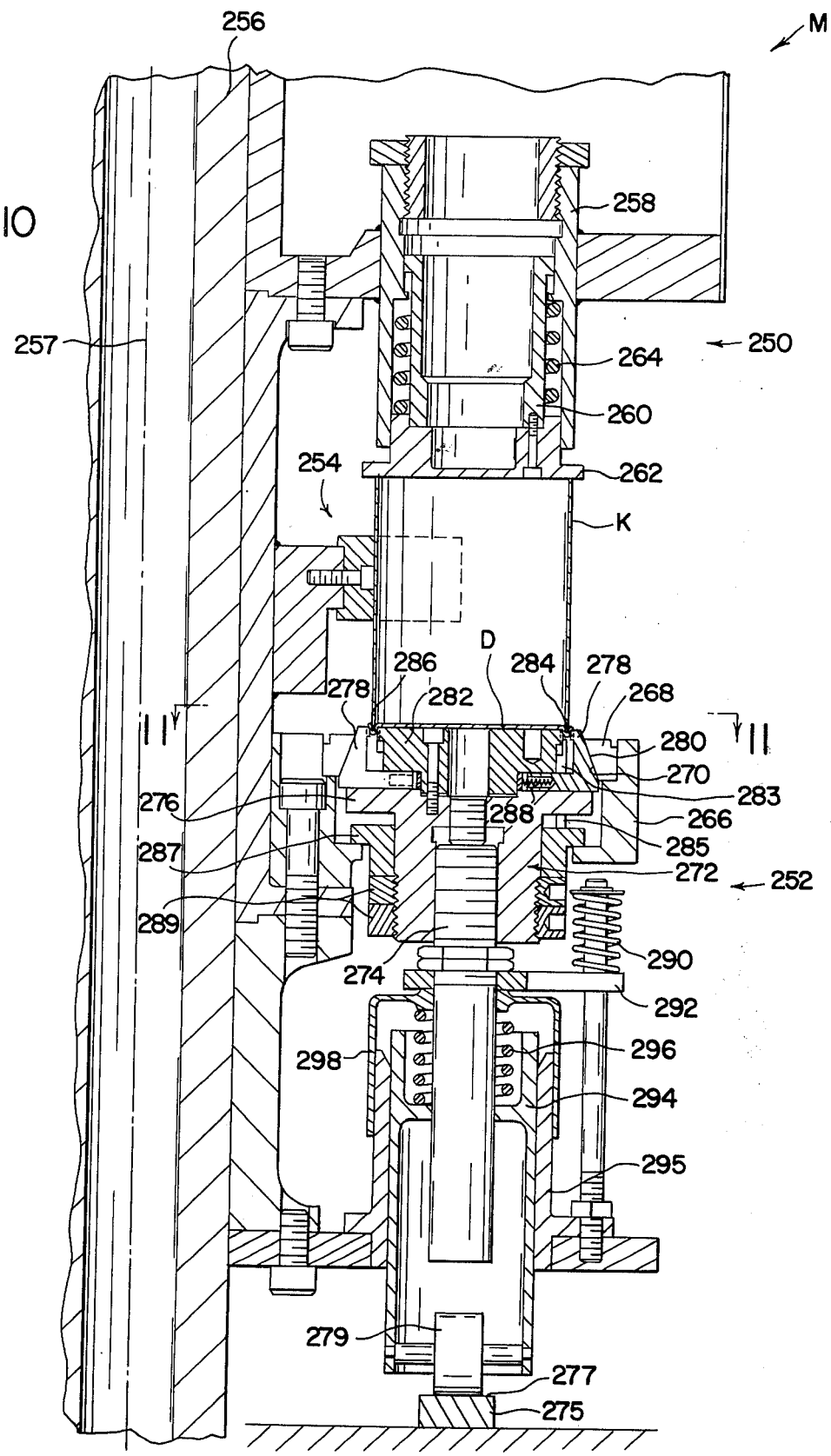
FIG. 10 is a sectional elevation view of a can body and can end clamping assembly taken along line 10—10 in FIG. 8; and, FIG. 11 is a plan view of the lower portion of the clamping assembly taken along line 11—11 in FIG. 10.
Figure 11:
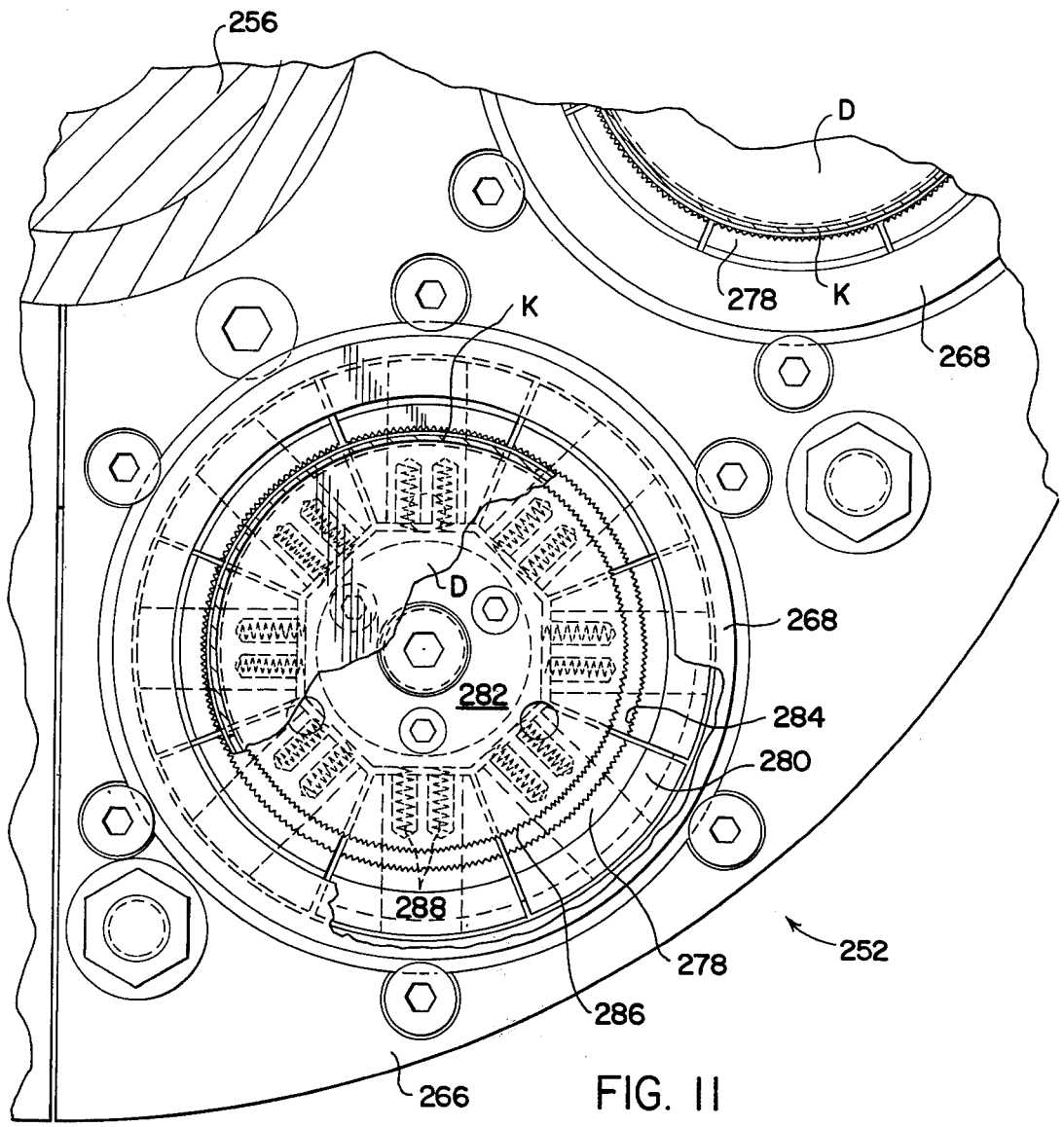

As illustrated in FIGS. 9 and 10, each clamping and crimping assembly is comprised of an upper component 250 and a lower component 252 which are disposed in spaced apart axially aligned relationship to receive a can body and can end assembly therebetween. Each assembly further includes an arcuate positioning component 254 which receives the body of a can end and body unit from the in-feed star wheel mechanism and positions the unit between and in alignment with components 250 and 252. Turret mechanism M includes a hub assembly 256 supporting components 250, 252, and 254 for rotation together about a vertical turret axis 257.

Upper component 250 includes an outer sleeve 258 fixed with respect to hub 256, and an inner sleeve 260 vertically reciprocable relative to sleeve 258 and provided at its lower end with a pressing head 262. Sleeve 260 and head 262 are biased downwardly relative to sleeve 258 by a compression spring 264 interposed therebetween. Pressing head 262 is of a diameter greater than that of the container body and is adapted to engage the upper edge of the container body as set forth hereinafter during the axial pressing operation.

Lower component 252 includes a support sleeve 266 which is fixed with respect to hub 256. Sleeve 266 carries a fixed annular cam element 268 having a cam surface 270 which inclines inwardly and upwardly with respect to the vertical axis of the clamping components. Component 252 further includes a vertically reciprocable plunger mechanism 272 including a vertically reciprocable shaft 274 carrying a collar component 276 at the upper end thereof. Collar 276 supports a plurality of radially displacable crimping fingers 278 having cam surfaces 280 which face cam surfaces 270 and incline upwardly and inwardly with respect to the vertical axis of the clamping components. Plunger mechanism 272 further includes a crimping anvil member 282 mounted on the upper end of shaft 274.

Crimping fingers 278 are provided at their upper ends with inwardly facing crimping edges 284, and anvil 282 is provided on its outer periphery with crimping edges 286 radially opposite edges 284. When the turret mechanism is positioned for a can end and can body assembly to be received between upper and lower components 250 and 252, crimping fingers 278 are radially spaced from anvil 282 to provide a space therebetween in which an annular ejector member 283 is disposed. Ejector 283 is supported by pins 285 extending from a collar 287 slidably surrounding plunger collar 276. When a can end and body assembly are initially positioned on the lower component, the upper end of ejector 283 is generally coplanar with the upper surface of fingers 278 and anvil 282. Collar 287 rests on sleeve 266 and is displacable upwardly therefrom by lock nuts 289 on collar 276 which are initially spaced below collar 287. When shaft 274 is displaced upwardly, collar 276, fingers 278 and anvil 282 are displaced toward pressing head 262 of upper component 250. Until nuts 289 engage collar 287, ejector 283 is not lifted, whereby the groove walls of can end D enter the space between fingers 278 and anvil 282. Further axial upward displacement of shaft 274 axially presses can body K and can end D toward one another by engagement thereof between components 250 and 252 to fully seat the lower peripheral edge of the can body in the groove in the can end. Further, upward displacement of collar 276 and anvil 282 causes camming engagement between cam surfaces 280 of fingers 278 and fixed cam surface 270 of cam 268, whereby fingers 278 are displaced radially inwardly of anvil 282. Such radial displacement causes crimping edges 284 and 286 to cooperatively crimp the inner and outer walls of the can end groove into tight engagement with the peripheral portion of the can body disposed in the can end recess. The axial pressing and radial crimping pressures are maintained as the turret rotates toward discharge assembly N.

When turret assembly M reaches discharge star wheel and guide assembly N, shaft 274 retracts, whereby crimping fingers 278 and anvil 282 move downwardly relative to fixed cam 268. During the initial downward movement, crimping fingers 278 are biased radially outwardly by corresponding spring components 288, whereby the crimping pressure about the peripheral can end and can body assembly is released.

Downward movement of shaft 274 is assured by a plurality of springs 290 which operate against a spring plate 292 mounted on the shaft for movement therewith. As mentioned hereinabove, shaft 274 is displaced upwardly by suitable cam means such as an annular cam plate 275 which follows the path of rotation of the upper and lower components about the turret axis and which has a cam surface 277 engaged by a cam roller 279 mounted on a cam sleeve 294 supported for reciprocating movement by a sleeve 295 supported by hub assembly 256. A spring 296 is interposed between cam sleeve 294 and in inverted spring cup 298 disposed beneath spring plate 292. Accordingly, upward displacement of shaft 274 is achieved through spring 296, and it will be appreciated therefore that the latter spring has a greater force in compression than the combined forces of springs 290, whereby upward displacement of shaft 274 is in effect against the bias of springs 290 and 296. Spring 296 serves to absorb shock during initial displacement of cam sleeve 294 and thus shaft 274 in the upward direction, and cushions return movement of the components to the lowermost positions thereof. It will be appreciated, however, that many arrangements for achieving upward displacement of shaft 274 in accordance with the principles of the present invention could be employed.

It will be appreciated from the foregoing description that a method and apparatus is provided for sequentially withdrawing pre-formed can ends from a supply stack, applying a joining compound to the can ends, orienting the can ends with respect to can bodies with which they are to be joined and such that an end of a can body engages the joining compound applied to a corresponding can end, and then axially pressing and radially crimping the can end relative to the can body to assure a tight sealing engagement and bond therebetween. While a specific embodiment of apparatus has been disclosed and described for achieving the assembly operation, it will be appreciated that the overall structure of the apparatus as well as that of specific components described can readily be modified without departing from the principles of the present invention. As many possible embodiments of the invention may be made, and as many possible changes may be made in the embodiment herein illustrated and described, it is to be distinctly understood that the foregoing descriptive matter is to be interpreted merely as illustrative of the present invention and not as a limitation.

What is claimed is:

1. Apparatus for assembling and joining can bodies having peripheral end edges with preformed can ends having can body receiving peripheral grooves, comprising:

means to support a supply of can ends;
conveyor means adapted to receive and intermittently convey a can end through a series of stations;
means to deliver a can end from said supply onto said conveyor means with said peripheral groove facing upwardly;
means at one of said stations to deposit joining compound in the peripheral groove of said can end;
means to position a peripheral end edge of a can body in said groove to contact the joining compound therein; and
means to close said peripheral groove about said peripheral end edge of said can body.

2. Apparatus according to claim 1, and means at said one station to detect the absence of a can end and prevent operation of said means to deposit joining compound.

3. Apparatus according to claim 1, wherein said means to position a can body end edge includes can body supply and feed means, and means to detect the absence of a can body along said last named means to prevent delivery of a can end from said supply.

4. Apparatus according to claim 1, wherein said means to close said peripheral groove includes means to axially press said can body and can end relative to one another.

5. Apparatus according to claim 1, and means to support and lift said can end at said one station prior to the deposit of joining compound in the peripheral groove thereof, and means to actuate said means to deposit joining compound when said can end is lifted.

6. Apparatus according to claim 5, and means to rotate said supporting and lifting means while said can end is lifted.

7. Apparatus according to claim 1, and can end supporting and lifting means at said one station and comprising a vertically shiftable can end engaging upper member, a rotatable and vertically shiftable can end engaging lower member, a first cam follower secured to said lower member, a first cam adapted to actuate said first cam follower for a can end to be grasped between said upper and lower members and vertically lifted, and means to rotate said lower member.

8. Apparatus according to claim 7, and means to actuate said means to deposit joining compound to said can end when said can end is lifted.

9. Apparatus according to claim 8, wherein said upper member includes rotatable head means engaging said lifted can end, said head means being rotated by said lower member through said can end grasped therebetween.

10. Apparatus according to claim 1, wherein said means to close said peripheral groove about said peripheral end edge of said can body includes upper and lower closing members adapted to receive said can body and can end therebetween, and means to displace said upper and lower members relative to one another to clamp said can body and can end therebetween to fully seat said peripheral end edge of said can body in said peripheral groove.

11. Apparatus according to claim 10, wherein said lower member includes radially inner and outer crimping means adapted to receive the walls defining said peripheral groove therebetween, and means operable in response to relative reciprocation of said upper and lower members toward one another to radially constrict said groove.

12. Apparatus according to claim 11, wherein said radially inner and outer crimping means includes fixed crimping anvil means and radially displacable crimping finger means, said means responsive to relative reciprocation of said upper and lower members including cam means operable to move said displacable crimping finger means toward said crimping anvil means.

13. Apparatus according to claim 1, wherein said means to support a supply of can ends includes means supporting can ends in a vertical stack with said grooves facing upwardly, and said means to deliver a can end includes means to withdraw the bottom most can end from said stack.

14. Apparatus according to claim 13, and can end level detecting means for said stack.

15. Apparatus according to claim 13, wherein said conveyor means comprises a pair of feed bars, means to reciprocate said feed bars relative to said stack and one station and between retracted and extended positions, said feed bars having first and second pairs of can end engaging fingers disposed respectively at said stack and one station when said feed bars are retracted, said first pair of fingers engaging and transporting a can end to said one station when said feed bars move to the extended position and said second fingers simultaneously engaging and displacing a can end at said one station to a second station, and means to support and lift said can end at said one station to permit said second pair of fingers to pass thereneath when said feed bars return to the retracted position.

16. Apparatus according to claim 15, and means operable while said can end is lifted to actuate said means to deposit joining compound in said groove of said can end.

17. Apparatus according to claim 16, and means to rotate said supporting and lifting means.

18. Apparatus according to claim 17, wherein said means to close said peripheral groove about said peripheral end edge of said can body includes upper and lower closing members adapted to receive said can body and can end therebetween, and means to displace said upper and lower members relative to one another to clamp said can body and can end therebetween to fully seat said peripheral end edge of said can body in said peripheral groove.

19. Apparatus according to claim 18, wherein said lower member includes radially inner and outer crimping means adapted to receive the walls defining said peripheral groove therebetween, and means operable in response to relative reciprocation of said upper and lower members toward one another to radially constrict said groove.

20. Apparatus according to claim 19, wherein said radially inner and outer crimping means includes fixed crimping anvil means and radially displacable crimping finger means, said means responsive to relative reciprocation of said upper and lower members including cam means operable to move said displacable crimping finger means toward said crimping anvil means.

21. Apparatus according to claim 15, wherein said means to positin said can body end edge and can end includes first transfer means having an input station, said feed bars including third finger means for engaging and displacing said can end from said second station toward said input station when said feed bars move from the retracted to the extended position.

22. Apparatus according to claim 21, wherein said first transfer means transports a joined can end and body to said closing means, and second transfer means adapted to receive and transport a closed can end and body from said closing means.

23. Apparatus according to claim 22, wherein said first transfer means is a rotatable multi-pocketed infeed star wheel, said closing means is a multi-station rotatable turret, and said second transfer means is a multi-pocketed out-feed star wheel.

24. Apparatus according to claim 15, wherein said can end supporting and lifting means comprises a vertically shiftable can end engaging upper member, a rotatable and vertically shiftable can end engaging lower member, a first cam follower secured to said lower member, a first cam adapted to actuate said first cam follower for a can end to be grasped between said upper and lower members and vertically lifted, and means to rotate said lower member.

25. Apparatus according to claim 24, and means operable when said can end is lifted to actuate said means to deposit joining compound in the groove of said can end.

26. Apparatus according to claim 24, wherein said upper member includes a second cam follower, and second cam means on one of said feed bars for movement therewith, said second cam means engaging said second cam follower to displace said upper member upwardly during movement of said feed bars from the retracted to the extended position.

27. Apparatus according to claim 26, wherein said upper member includes rotatable head means engaging said lifted can end, said head means being rotated by said lower member through said can end grasped therebetween.

28. Apparatus according to claim 27, and detector means adapted to detect the presence of a can end between said upper and lower members and operable when a can end is detected to actuate said joining compound depositing means.

29. Apparatus according to claim 28, including a can end and can body assembling station, said conveyor means sequentially transporting can ends delivered from said supply to said assembling station, means to sequentially transport can bodies to said assembling station, means to detect the absence of a can body at said assembling station, and means controlled by said detector means and operable in response to such detection to prevent delivery of the corresponding can end from said supply.

30. Apparatus according to claim 29, wherein said conveyor means further includes means to transport can ends to said assembling station, said transporting means comprising guide means and star wheel means, said guide means including surface means to receive a given can end from said feed bars, said star wheel means including pocket means to receive and position a given can body above said given can end on said surface means, and said guide means further including means on said star wheel means to axially position said given can end on said surface means in alignment with said pocket means.

31. Apparatus according to claim 24, wherein said means to close said peripheral groove about said peripheral end edge of said can body includes upper and lower closing members adapted to receive said can body and can end therebetween, and means to displace said upper and lower members relative to one another to clamp said can body and can end therebetween to fully seat said peripheral end edge of said can body in said peripheral groove.

32. Apparatus according to claim 31, wherein said lower member includes radially inner and outer crimping means adapted to receive the walls defining said peripheral groove therebetween, and means operable in response to relative reciprocation of said upper and lower members toward one another to radially constrict said groove.

33. Apparatus according to claim 32, wherein said radially inner and outer crimping means includes fixed crimping anvil means and radially displacable crimping finger means, said means responsive to relative reciprocation of said upper and lower members including cam means operable to move said displacable crimping finger means toward said crimping anvil means.

* * * * *